United States Patent

Appelt

[15] 3,705,392

[45] Dec. 5, 1972

[54] MOS DYNAMIC MEMORY

[72] Inventor: Daren Ray Appelt, Houston, Tex.

[73] Assignee: Texas Instruments Incorporated, Dallas, Tex.

[22] Filed: Sept. 7, 1971

[21] Appl. No.: 177,975

[52] U.S. Cl......340/173 R, 340/172.5, 340/173 CA, 307/310

[51] Int. Cl...........................G11c 11/24, G11c 11/40

[58] Field of Search........340/173 R, 172.5, 173 GA; 307/238, 279, 304, 310; 317/235 B

[56] References Cited

UNITED STATES PATENTS 3,488,529 1/1970 Howe..................................307/310

3,453,887 7/1969 Wooten................................307/304

*Primary Examiner*—James W. Moffitt

*Attorney*—Harold Levine et al.

[57] ABSTRACT

An MOS memory array has a number of memory cells fabricated on a single chip. A refresh control sensor senses the temperature of the environment of the MOS memory array. The MOS memory array is refreshed depending upon the environmental temperature of the memory array. This allows a minimum power consumption in the standby mode of the MOS dynamic memory.

6 Claims, 2 Drawing Figures

MOS DYNAMIC MEMORY

This invention is directed to an MOS dynamic memory. It is more particularly directed to a dynamic MOS memory adapted to maintain and store data when normal system power is removed.

MOS dynamic memories, by their very nature, must have power continually applied to the memory to maintain stored data. There are many instances in which normal system power is removed; for instance, during power failures of the system power, when a system is shipped to a user or when power interrupts of long duration are anticipated such as in military systems. It is highly desirable to maintain memory data by using a standby power source for durations of a month or more.

In maintaining memory data in MOS dynamic memories, pulsing of power and other memory control signals must be done often enough to maintain charge in certain internal capacitors. For present MOS dynamic memory arrays, a certain minimum refresh rate is specified by the semiconductor manufacturers to maintain memory data in the memory arrays. To maintain a minimum power use, the present technique is to switch off all power to the control logic and other power drains between the refresh pulses to reduce the power consumption to a low value that depends directly on the refresh rate. This present approach to reduce the power consumption still requires a significant enough power use to require a large capacity standby power source which is unacceptable in many instances.

It is therefore an object of this invention to provide a new and improved MOS dynamic memory.

It is another object of this invention to reduce the standby power consumption of an MOS dynamic memory.

Another object of this invention is to reduce the power consumption in the standby mode of an MOS dynamic memory.

Figure 1:
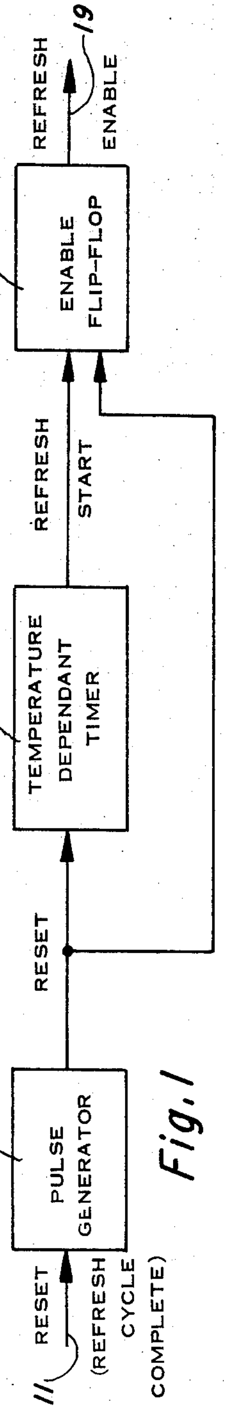
FIG. 1 shows a block diagram of a circuit to control the refresh cycle of an MOS dynamic memory.

Referring now to FIG. 1, for a description of the refresh control circuit a reset pulse is applied to terminal 11 to a pulse generator 13 when the refresh cycle in the MOS memory is completed. Pulse generator 13 applies a reset pulse to a temperature-dependent timer 15 and a reset pulse to a refresh enable flip-flop 17. Temperature-dependent timer 15 applies a refresh start signal to the refresh enable flip-flop 17. The refresh enable flip-flop 17 applies on output terminal 19 a refresh enable signal to the refresh circuit in the MOS memory.

The refresh control circuit shown in FIG. 1 determines when the refresh in the MOS dynamic memory needs to be carried out. The pulse generator 13 is triggered at the completion of the refresh cycle then generates an output pulse to reset the temperature-dependent timer 15 and reset the refresh enable flip-flop 17. At the time the reset pulse is applied to the pulse generator 13, a refresh cycle from an MOS dynamic memory has been completed. The temperature-dependent timer 15 then begins timing a new cycle. There are thermistors with a negative temperature coefficient in the temperature-dependent timer which determine the output current of a current source to charge a capacitor in the temperature-dependent timer 15. When the capacitor in the temperature-dependent timer 15 reaches a specific charge potential, a refresh start pulse is generated from the temperature-dependent timer 15 and applied to the refresh enable flip-flop 17 to set the refresh enable flip-flop 17. The refresh enable flip-flop 17 then applies a refresh enable output signal on terminal 19 to the refresh circuit in the MOS dynamic memory to start a new refresh cycle. The start of the refresh cycle in the MOS memory itself is dependent upon the memory controller in the MOS dynamic memory. When the refresh cycle in the MOS dynamic memory is finished, a reset input is applied to the pulse generator 13 to reset the temperature-dependent timer. The reset enable flip-flop 17 is also reset.

By using the refresh control circuit as shown, the power consumption in the standby mode of an MOS dynamic memory can be reduced by a factor of 20 at room temperature. This circuit will allow a typical MOS dynamic memory to be sustained for a month or more on a small, rechargeable battery. Without taking advantage of this refresh control circuit, such a battery might provide only 2 days of standby operation.

Figure 2:
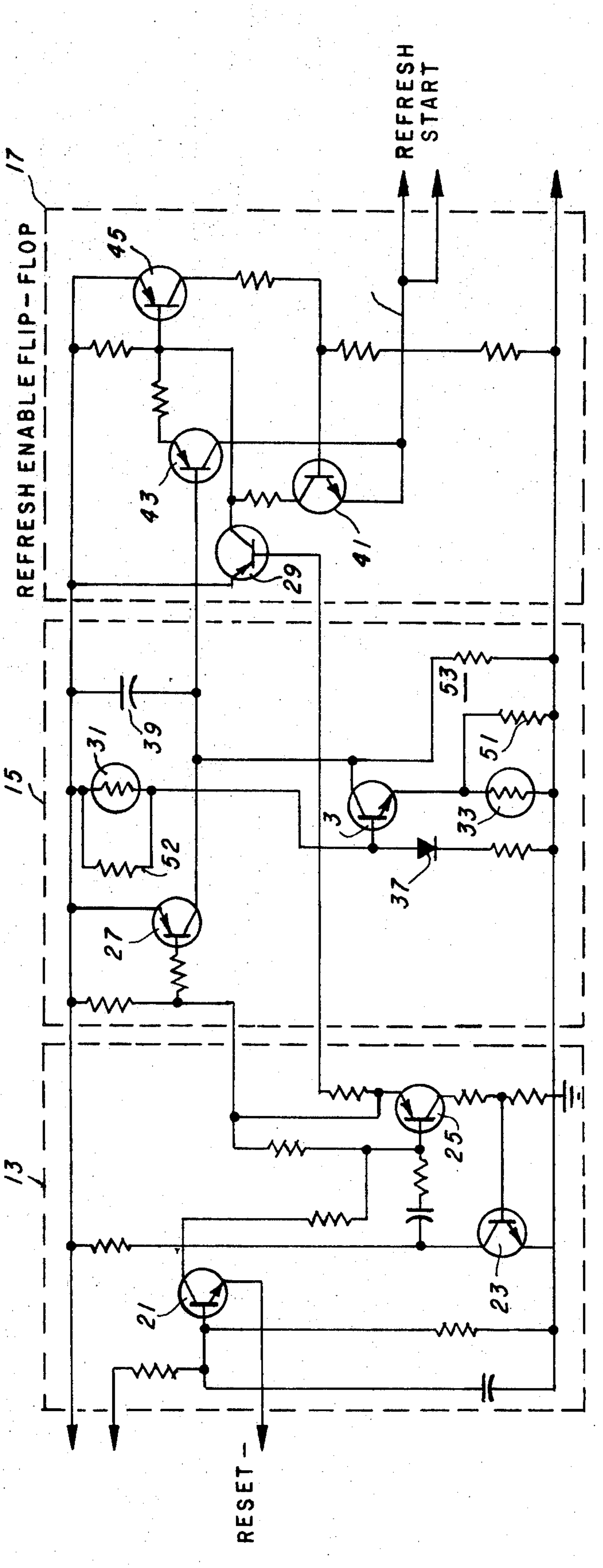
FIG. 2 shows the circuit shown in FIG. 1 in more detail.

Referring now to FIG. 2, the pulse generator 13 is a mono-stable multivibrator consisting of transistors 21, 23 and 25. The output from the pulse generator is the emitter output from transistor 25 applied to the base of transistors 27 and 29. Transistor 27 is in the temperature-dependent timer while transistor 29 is in the refresh enable flip-flop 17. Two thermistors 31 and 33 in the temperature-dependent timer 15 sense the temperature of the environment of the MOS dynamic memory. Resistors 51–53 allow for adjustment of the shape of the refresh rate versus temperature curve of the temperature-dependent timer. These two thermistors 31 and 33 determined the collector current and transistor 3 in the temperature-dependent timer 15. Diode 37 is a standard silicon diode. As the temperature increases, the temperature increase is sensed by thermistors 31 and 33, which in turn increase the collector current of transistor 3. The collector current of transistor 3 charges the timing capacitor at a predetermined reference level of approximately 1 ½ volts. When the timing capacitor 39 is charged to the reference level, it sets a refresh enable flip-flop 17 consisting of transistors 41, 43 and 45. When the refresh enable flip-flop 17 is set, the output from the emitter of transistor 41 is applied on output terminal 19 to the MOS dynamic memory as a refresh start signal to start the refresh cycle. The output to the refresh start is the refresh input of the standard MOS dynamic memory.

When the refresh cycle is finished a reset signal is applied to terminal 11 to reset the refresh enable flip-flop and start a new timing cycle.

What is claimed is:

1. In an MOS memory array comprising means for sensing the temperature of said MOS memory array and means responsive to said temperature sensing means for initiating a refresh of said MOS memory array.

2. The invention claimed in claim 1 having a flip-flop reset by said pulse generator and set by said temperature-dependent timer when said temperature-dependent timer generates a refresh start pulse to start a refresh cycle in said MOS memory array.

3. In a MOS memory array comprising a pulse generator set when a refresh cycle in said MOS memory array is completed, a temperature-dependent timer reset by said pulse generator when a refresh cycle is completed, said temperature-dependent timer responsive to the completion of a refresh cycle in said MOS memory array to begin timing a new cycle, at least one thermistor having a negative temperature coefficient, a capacitor in said temperature-dependent timer, said capacitor charged according to the temperature of said MOS memory array sensed by said thermistors, said temperature-dependent timer generating a refresh start pulse to start a refresh cycle in said MOS memory array when said capacitor is charged to a predetermined potential.

4. In an MOS memory array comprising means for sensing and temperature of said MOS memory array, a temperature-dependent timer, said temperature-dependent timer responsive to said temperature sensing means for initiating a refresh cycle in said MOS memory array when said temperature-dependent timer reaches a predetermined level.

5. In an MOS memory array having a temperature-dependent timer, said temperature-dependent timer having a first thermistor and a second thermistor to sense the temperature of the environment of said MOS memory array, a timing capacitor in said temperature-dependent timer being capable of being charged to a predetermined reference level dependent upon the temperature sensed by said thermistors, said temperature-dependent timer generating a refresh enable pulse when said timing capacitor has been charged to said predetermined reference level, said refresh enable pulse starting a refresh cycle in said MOS memory array.

6. In an MOS memory array, a pulse generator, said pulse generator reset by the completion of a refresh cycle in said MOS memory array, a temperature-dependent timer, said temperature-dependent timer having at least one thermistor to sense the environment of said MOS memory array, said temperature-dependent timer having a timing capacitor, said timing capacitor charged to a predetermined reference level dependent upon the temperature sensed by said thermistors, said temperature-dependent timer producing a pulse when said timing capacitor is charged to said predetermined reference level, a refresh enable flip-flop, said refresh enable flip-flop set when said temperature-dependent timer produces an output pulse, said refresh enable flip-flop applying a refresh enable signal to said MOS memory array to start a refresh cycle in said MOS memory array.

* * * * *